United States Patent
Hunklinger et al.

(10) Patent No.: US 10,767,732 B2
(45) Date of Patent: Sep. 8, 2020

(54) ECCENTRIC GEAR DRIVE WITH REDUCED BACKLASH

(71) Applicant: Ecolab USA Inc., St. Paul, MN (US)

(72) Inventors: Herbert Hunklinger, Siegsdorf (DE); Rudolf Albrecht, Bad Aibling (DE)

(73) Assignee: Ecolab USA Inc., Saint Paul, MN (US)

( * ) Notice: Subject to any disclaimer, the term of this patent is extended or adjusted under 35 U.S.C. 154(b) by 182 days.

(21) Appl. No.: 15/682,923

(22) Filed: Aug. 22, 2017

(65) Prior Publication Data

US 2019/0063554 A1 Feb. 28, 2019

(51) Int. Cl.
*F16H 1/28* (2006.01)
*F16H 55/18* (2006.01)
(Continued)

(52) U.S. Cl.
CPC ............ *F16H 1/2863* (2013.01); *F04B 9/04* (2013.01); *F04B 43/02* (2013.01); *F16H 19/02* (2013.01);
(Continued)

(58) Field of Classification Search
CPC .. F16H 1/2863; F16H 2055/185; F16H 55/18; F16H 55/14; F16H 2055/176; F04B 9/04; F04B 9/045; F04B 43/02
(Continued)

(56) References Cited

U.S. PATENT DOCUMENTS

| | | | |
|---|---|---|---|
| 3,196,847 A * | 7/1965 | Penner | F02B 53/00 123/207 |
| 4,189,951 A | 2/1980 | Sauter | |

(Continued)

FOREIGN PATENT DOCUMENTS

| | | | |
|---|---|---|---|
| DE | 102014214743 A1 * | 1/2016 | ............ F16H 55/17 |
| DE | 102014214743 A1 | 1/2016 | |

(Continued)

OTHER PUBLICATIONS

Hastrich, et al., "State of the Art and Recent Advances for Fluid and Dry Lubricated Harmonic Drive Gears," Robotics.estec.esa.int, 2016, 9 pages.
International Patent Application No. PCT/US2018/047487, International Search Report and Written Opinion dated Oct. 12, 2018, 18 pages.

* cited by examiner

*Primary Examiner* — Jake Cook
*Assistant Examiner* — Gregory Robert Weber
(74) *Attorney, Agent, or Firm* — Fredrikson & Byron, P.A.

(57) ABSTRACT

A gear drive system is provided having a first gear and a second gear. The second gear has a first peripheral portion and a second peripheral portion. A first set of gear teeth can be defined peripherally over the first peripheral portion and/or the second peripheral portion. The first peripheral portion and/or the second peripheral portion can be more resilient, resulting in a first backlash between the first set of gear teeth and the teeth of the first gear, less than a second backlash between the second set of gear teeth and the teeth of the first gear. Each gear tooth of the second gear can have a gear tooth spacing between adjacent gear teeth. The gear tooth spacing over the first peripheral portion and/or the second peripheral portion can be less than the gear tooth spacing at portions other than the first peripheral portion and/or the second peripheral portion.

25 Claims, 4 Drawing Sheets

(51) Int. Cl.
*F04B 9/04* (2006.01)
*F04B 43/02* (2006.01)
*F16H 19/02* (2006.01)
*F16H 55/14* (2006.01)
*F16H 55/17* (2006.01)
*F16H 1/10* (2006.01)

(52) U.S. Cl.
CPC ............. *F16H 55/14* (2013.01); *F16H 55/18* (2013.01); *F16H 1/10* (2013.01); *F16H 2055/176* (2013.01)

(58) Field of Classification Search
USPC ...................................................... 74/52, 409
See application file for complete search history.

(56) References Cited

U.S. PATENT DOCUMENTS

| | | | |
|---|---|---|---|
| 4,262,251 A * | 4/1981 | Fujishiro | F02P 17/02 324/166 |
| 4,364,520 A * | 12/1982 | Weber, Sr. | F04B 43/067 239/330 |
| 5,372,065 A * | 12/1994 | Cuozzo | B41K 3/123 101/106 |
| 5,593,360 A | 1/1997 | Ishida et al. | |
| 5,687,811 A * | 11/1997 | Shimizu | B62D 3/12 180/428 |
| 6,470,993 B1 * | 10/2002 | Matsuda | B62D 3/126 180/444 |
| 6,789,439 B2 | 9/2004 | Tung | F16H 19/043 74/112 |
| 7,886,887 B2 * | 2/2011 | Bassett | F16D 43/10 192/105 CP |
| 8,001,948 B2 * | 8/2011 | Chio | F02B 75/22 123/197.4 |
| 8,613,459 B2 * | 12/2013 | Yang | B62D 3/126 280/93.514 |
| 8,695,449 B2 | 4/2014 | Lang | |
| 8,708,357 B2 * | 4/2014 | Sumihara | B62D 3/12 280/93.514 |
| 8,826,765 B2 * | 9/2014 | Teramoto | F16H 55/14 74/434 |
| 9,291,248 B2 | 3/2016 | Mittermair et al. | |
| 9,500,270 B2 | 11/2016 | Vandewal et al. | |
| 9,506,550 B2 | 11/2016 | Dickinger et al. | |
| 9,618,107 B2 | 4/2017 | Muller et al. | |
| 9,815,341 B2 * | 11/2017 | Miu | B60C 23/12 |
| 9,835,233 B2 * | 12/2017 | Dunn | B60N 2/2251 |
| 2005/0183531 A1 | 8/2005 | Hagihara et al. | |
| 2008/0156574 A1 | 7/2008 | Otsuki | |
| 2008/0226480 A1 * | 9/2008 | Ferran | F04C 18/22 418/5 |
| 2010/0014998 A1 * | 1/2010 | Conner | F04B 43/02 417/413.1 |
| 2012/0227529 A1 * | 9/2012 | Fischer | F02N 15/046 74/434 |
| 2012/0312624 A1 * | 12/2012 | Boyle | B62D 3/06 180/432 |
| 2013/0217531 A1 * | 8/2013 | Kume | H02K 5/04 475/149 |
| 2015/0053031 A1 | 2/2015 | Willcox et al. | |
| 2016/0053881 A1 | 2/2016 | Zeller et al. | |
| 2016/0229009 A1 | 8/2016 | Klein-Hitpass et al. | |
| 2016/0354914 A1 * | 12/2016 | Bartoszek | B25F 5/001 |
| 2017/0215667 A1 * | 8/2017 | Thorne | A47L 9/30 |
| 2018/0338656 A1 * | 11/2018 | Carter | A47L 9/0477 |

FOREIGN PATENT DOCUMENTS

| | | | |
|---|---|---|---|
| GB | 285492 A | 11/1928 | |
| GB | 671706 A * | 5/1952 | ............. F02M 37/04 |
| WO | 2011101120 A1 | 8/2011 | |
| WO | 2017013082 A1 | 1/2017 | |

US 10,767,732 B2

ECCENTRIC GEAR DRIVE WITH REDUCED BACKLASH

BACKGROUND

Reciprocating pumps such as diaphragm pumps are typically driven by a motor and coupled thereto by a gear drive. In such systems, a motor can be connected to a gear drive. The gear drive can have a pinion and a ring gear. An eccentric may be coupled to the ring gear and to a plunger. An opposite end of the plunger may drive a diaphragm or a membrane. The load and/or torque on the ring gear can vary during operation of the pump. For instance, at certain positions, the torque and/or force acting on the wheel changes directions.

Conventional gear drive systems have backlash between gears to reduce overheating or damage to the gears. Backlash may be provided in the form of clearance (e.g., a gap) between at least portions of adjacent surfaces of intermeshing gears. However, backlash can cause noise when there are alternating loads and/or torques.

SUMMARY

In one aspect, this disclosure is directed to a gear drive system. The gear drive system comprises a first gear comprising plurality of teeth. The gear drive system includes a second gear. The second gear can have a first peripheral portion and a second peripheral portion peripherally opposite to the first peripheral portion. A first set of gear teeth can be defined peripherally over the first peripheral portion and/or the second peripheral portion. A second set of gear teeth can be defined peripherally at portions other than the first peripheral portion and/or the second peripheral portion.

In another aspect, the first peripheral portion and/or the second peripheral portion can be more resilient relative portions other than the first peripheral portion and/or the second peripheral portion, resulting in a first backlash between the first set of gear teeth and the teeth of the first gear, and a second backlash between the second set of gear teeth and the teeth of the first gear. The first backlash can be less than the second backlash.

In another aspect, the second gear has gear teeth defined peripherally over a substantial perimeter of the second gear. Each gear tooth of the second gear can have a gear tooth spacing between adjacent gear teeth. The gear tooth spacing over at least one of the first peripheral portion and the second peripheral portion can be less than the gear tooth spacing at portions substantially other than the first peripheral portion and/or the second peripheral portion.

The details of one or more examples are set forth in the accompanying drawings and the description below. Other features, objects, and advantages will be apparent from the description and drawings, and from the claims.

DETAILED DESCRIPTION

Figure 1:
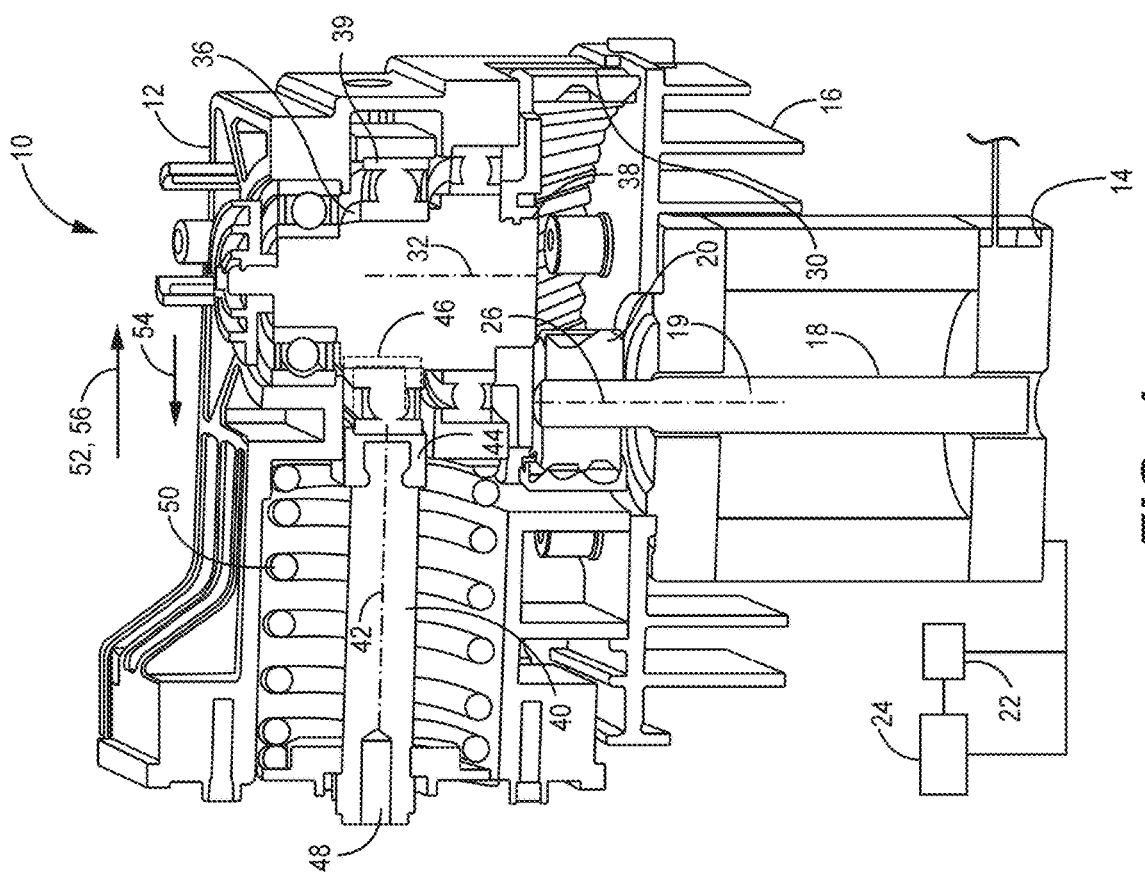
FIG. 1 is a cross-sectional perspective view of a gear drive system.

FIG. 1 illustrates a cross-sectional perspective view of a gear drive system 10. The gear drive system 10 can be coupled to a reciprocating pump (e.g., a diaphragm pump) in certain exemplary embodiments. In such cases, the pump drive system may receive torque (e.g., from a motor) and convert rotary motion to reciprocating motion. The reciprocating motion can in turn be used to pressurize fluid (e.g., via a diaphragm) in a fluid chamber within the pump. Although a reciprocating pump is used as an example, it should be understood that the gear drive system 10 can be used to transmit torque in any rotary and/or reciprocating pumps. Further, the gear drive systems described herein may be used in a variety of torque transmission systems in rotary and/or reciprocating devices, and the examples listed herein should not be construed as being limited to a pump.

Continuing with FIG. 1, the gear drive system 10 is housed within a housing 12 (e.g., may be referred to as a "gear box"). A motive source such as an electric motor can be coupled to the gear drive system 10. In the illustrated exemplary embodiment, the motor 14 is housed within a motor housing 16 and has an output shaft 18. The output shaft 18 has a shaft axis 19 about which the output shaft 18 rotates. The output shaft 18 protrudes past the motor housing 16 and engages with a first gear 20 of the gear drive system 10. In the illustrated embodiment, the output shaft 18 may be frictionally mounted to the first gear 20. Alternatively, the output shaft 18 may be directly or indirectly rotationally coupled to the first gear 20.

The motor 14, according to some exemplary embodiments can be a stepper motor. Alternatively, any other type of motive source may be used, and the illustrated embodiments should not be construed as being limited to a stepper motor. As illustrated schematically in FIG. 1, the motor 14 can be operatively coupled to a motor controller 22. The motor 14 can also be connected to a power supply 24, for transmitting power to the motor 14. The motor controller 22 can be electrically coupled to the motor 14 and can transmit (and/or receive) electrical signals to control the motor 14.

Figure 2:
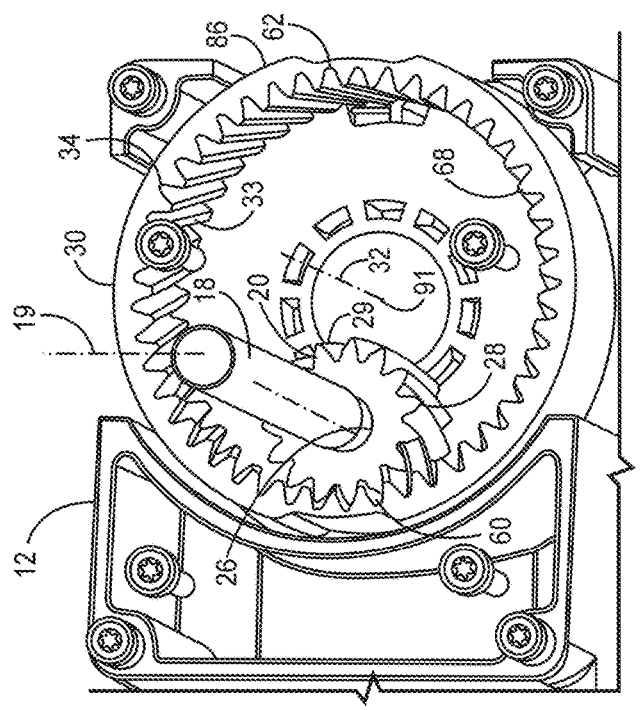
FIG. 2 is a cross-sectional top perspective view of a portion of the gear drive system of FIG. 1.

FIG. 2 illustrates a cross-sectional top perspective view of a portion of the gear drive system 10. As mentioned above, and referencing FIG. 2, the gear drive system 10 includes a first gear 20. The first gear 20, in the present non-limiting embodiment is the "driving" gear, because of its rotational coupling with the output shaft 18 of the motor 14. As illustrated, the first gear 20 has a first central axis 26. The first gear 20 can rotate about the first central axis 26. The first central axis 26 can be, in some embodiments, coaxial with the shaft axis 19 of the output shaft 18. The first gear 20 can have a plurality of teeth 28. The teeth 28 can be defined on an exterior surface 29 of the first gear 20.

As illustrated in FIG. 2, in certain non-limiting embodiments, the first gear 20 can be a pinion. Accordingly, the first gear 20 can be housed interior to a second gear 30 as will be described further below. Alternatively, the first gear 20 can be housed exterior to the second gear 30. Still further, the first central axis 26 may be non-coaxial with the shaft axis 19. Additional drive train components for selectively transmitting power can be provided in the gear drive system.

Continuing with FIG. 2, the first gear 20 is rotationally coupled to a second gear 30. The second gear 30 has a second central axis 32. The second gear 30 can be rotatable about the second central axis 32. In the illustrated example, the second central axis 32 is parallel to the first central axis 26 and the shaft axis 19. However, in some embodiments, the first central axis 26 (and correspondingly, the shaft axis 19) is radially offset from the second central axis 32. As such, in the illustrated non-limiting embodiment, the first gear 20 is housed interior to the second gear 30. Accordingly, the second gear 30 can sometimes be referred to as a "ring gear." The second gear 30 has gear teeth 33 defined on an interior surface 34 of the second gear 30. The interior surface 34 can be the surface corresponding to the troughs of the gear teeth 33. Alternatively, the interior surface 34 can be a surface (e.g., imaginary surface) corresponding to the apex of the gear teeth 33. Still further, the interior surface 34 can be a surface defined between the apex and trough of the gear teeth 33. Any surface interior to a surface forming the outermost boundary of the second gear 30 can be construed as an interior surface 34 according to certain non-limiting exemplary embodiments. The gear teeth 33 of the second gear 30 engage with the teeth 28 of the first gear 20. As a result, the second gear 30 can receive torque transmitted by the output shaft 18 of the motor 14 and/or first gear 20. In some such cases, the second gear 30 can be referred to as a "driven gear" because the second gear 30 can be driven by the rotation of the first gear 20.

Referring back to FIG. 1, the second gear 30 is connectable to an eccentric 36. In the illustrated embodiment, the second gear 30 has a central aperture 38 size to frictionally receive the eccentric 36. The eccentric 36 can be mounted on (or otherwise coupled to) the second gear 30. A set of bearings 39 can be housed within the housing 12 and/or surround the eccentric 36. Advantageously, the bearings 39 can reduce friction during operation of the gear drive system 10. As seen in FIG. 1, the eccentric 36 is attached (e.g., via a ring-shaped bracket) to a plunger 40. Alternatively, a camshaft may be provided to couple to the eccentric 36 and the plunger 40. The second gear 30 is therefore indirectly connected to the plunger 40. Accordingly, rotation of the second gear 30 (e.g., as a result of rotation of the output shaft 18 and first gear 20) can be transmitted by way of the eccentric 36 to the plunger 40. However, at least partially as a result of the radial offset between the first gear 20 and the second gear 30, rotational motion of the second gear 30 results in reciprocating motion of the eccentric 36 and/or the plunger 40. The plunger 40 thus reciprocates (e.g., translates linearly) along a longitudinal axis 42 of the plunger 40. The plunger 40 is movable along its axis between a first axial position 44 and a second axial position 46 in response to the rotation of the second gear 30.

Optionally, the plunger 40 can include a groove 48 to engage (e.g., directly or indirectly) to a pressurizing means. For example, the pressurizing means can be a diaphragm of a diaphragm pump. In such cases, the reciprocating motion of the plunger 40 can pressurize a fluid in a fluid chamber of the pump. Alternatively, reciprocating motion of the plunger 40 can be used to drive (e.g., transmit power to) various types of devices.

With continued reference to FIG. 1, the plunger 40 can, in some non-limiting embodiments, be spring-biased by a spring 50. In the illustrated embodiment, a coiled spring may provide a spring force on the plunger 40 to bias the plunger 40 to be in the first axial position 44. When the plunger 40 moves from the first axial position 44 to the second axial position 46, the torque provided by the motor 14 may overcome a load acting on the spring 50 and move the plunger 40 from the first axial position 44 to the second axial position 46. Appreciably, the force acting on the plunger 40 in such cases can be a sum of force due to load on the plunger 40 (acting as shown by arrow 52), spring force (as shown by arrow 54) and force due to motor torque (shown by arrow 56). Additionally, the plunger 40 may be biased to return from the second axial position 46 to the first axial position 44. In such cases, a motor torque may not be needed to move the plunger 40 to the first axial position 44. Consequently, motor torque may be zero when the plunger 40 moves from the second axial position 46 to first axial position 44. Accordingly, in some embodiments, the motor torque may alternate between a maximum value and a minimum value (e.g., sinusoidal variation) during rotation of the first gear 20 and/or the second gear 30.

Conventional pump drive systems may be noisy as a result of backlash between driven and driving gears, especially when direction of rotation of the driving gear is reversed. Accordingly, certain advantageous aspects of the present disclosure can include a gear drive system with reduced backlash. In some such embodiments, at certain portions of the gears, backlash may be about zero. Such embodiments may reduce and/or eliminate noise, and lead to quieter operation, especially when the direction of rotation of the gears is reversed.

Referring again to FIG. 2, the second gear 30 has a first peripheral portion 60 and a second peripheral portion 62 peripherally opposite to the first peripheral portion 60. The first peripheral portion 60 and the second peripheral portion 62 can each span a portion of the circumference of the second gear 30 (e.g., circumference of at least one of base circle, root circle, pitch circle or addendum circle of the second gear 30). For instance, the first peripheral portion 60 and the second peripheral can each span between about 5 degrees and about 40 degrees around the circumference of the second gear 30. In an example, the first peripheral portion 60 and the second peripheral portion 62 can each have between about one gear tooth and about 5 gear teeth. Additional or fewer gear teeth are contemplated within the scope of the present disclosure.

In some such embodiments, the second peripheral portion 62 can be separated from the first peripheral portion 60 by an angle based on the type of transmission and/or couplings provided to (indirectly) connect the motor 14 and the plunger 40. In some embodiments such as those illustrated, the first peripheral portion 60 and the second peripheral portion 62 can be peripherally offset by an angle of 180 degrees. In other embodiments, the first peripheral portion 60 and the second peripheral portion 62 can be peripherally offset by an angle less than 180 degrees. The first peripheral portion 60 can correspond to a portion of the second gear 30 when the plunger 40 is at the first axial position 44. The second peripheral portion 62 can correspond to a portion of the second gear 30 when the plunger 40 is at the second axial position 46. In some advantageous embodiments, when the first peripheral portion 60 engages with the first gear 20, backlash can be reduced and/or zero. Additionally, in some such embodiments, when the second peripheral portion 62 engages with the first gear 20, backlash can be reduced and/or zero.

Figure 3:
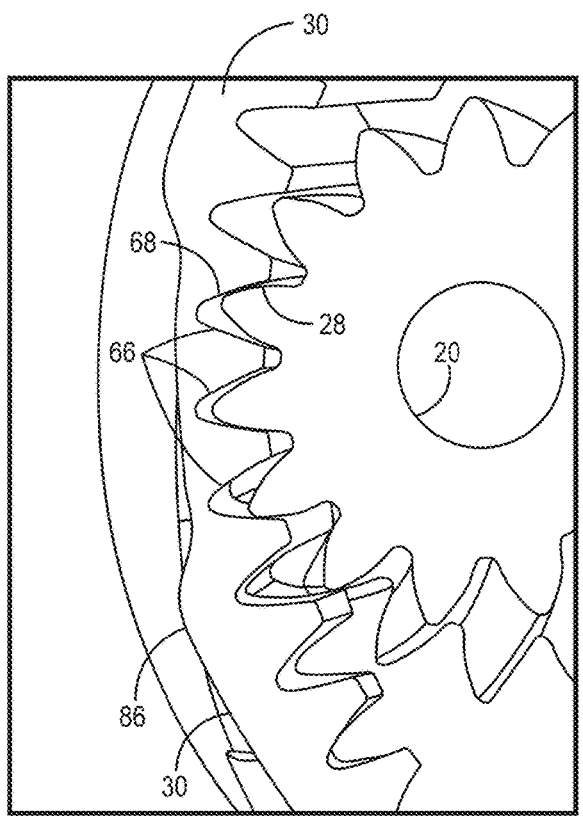
FIG. 3 is an enlarged perspective view of a portion of the gear drive system wherein the gears have a non-zero backlash.
Figure 4:
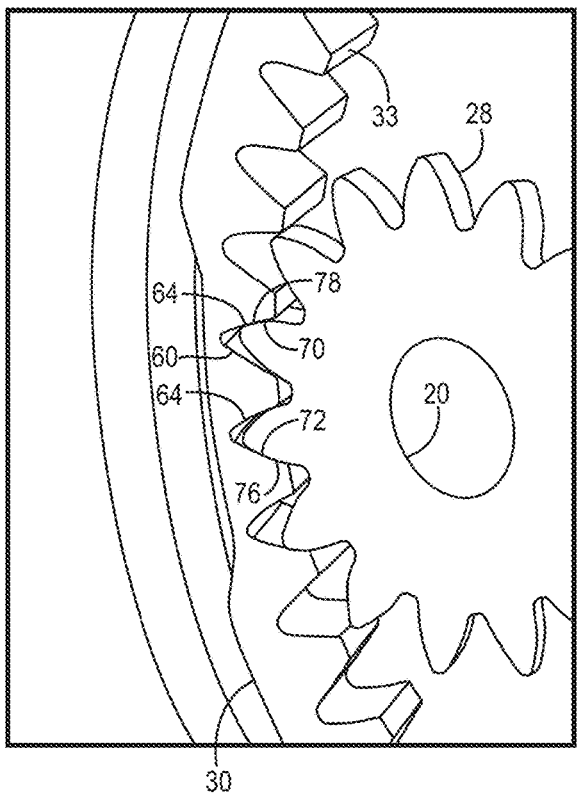
FIG. 4 is an enlarged perspective view of a portion of the gear drive system wherein the gears have a backlash lower than that illustrated in FIG. 3.

FIGS. 3 and 4 illustrate enlarged perspective views of a portion of the pump drive system. In FIG. 4 the gears have a backlash less than the backlash shown in FIG. 3. As seen in FIGS. 3 and 4, a first set of gear teeth 64 are defined peripherally over the first peripheral portion 60 and/or the second peripheral portion 62. A second set of gear teeth 66 are defined peripherally at portions other than the first peripheral portion 60 and/or the second peripheral portion 62. For instance, referring back to FIG. 2, the second gear 30 can have a third peripheral portion 68 extending between the first peripheral portion 60 and the second peripheral portion 62. The third peripheral portion 68 can extend over a substantial portion of the interior surface 34 of the second gear 30. The third peripheral portion 68, for instance, can extend between about 45 degrees and about 170 degrees over the circumference (e.g., of the pitch circle, root circle, base circle, addendum circle etc.) of the second gear 30. Accordingly, a ratio of circumferential distance of the first peripheral portion to the circumferential distance corresponding to third peripheral portion can be substantially less than one. Likewise, ratio of circumferential distance of the first peripheral portion to the circumferential distance corresponding to third peripheral portion can be substantially less than one. The second set of gear teeth 66 can be defined on the third peripheral portion 68.

Figure 6:
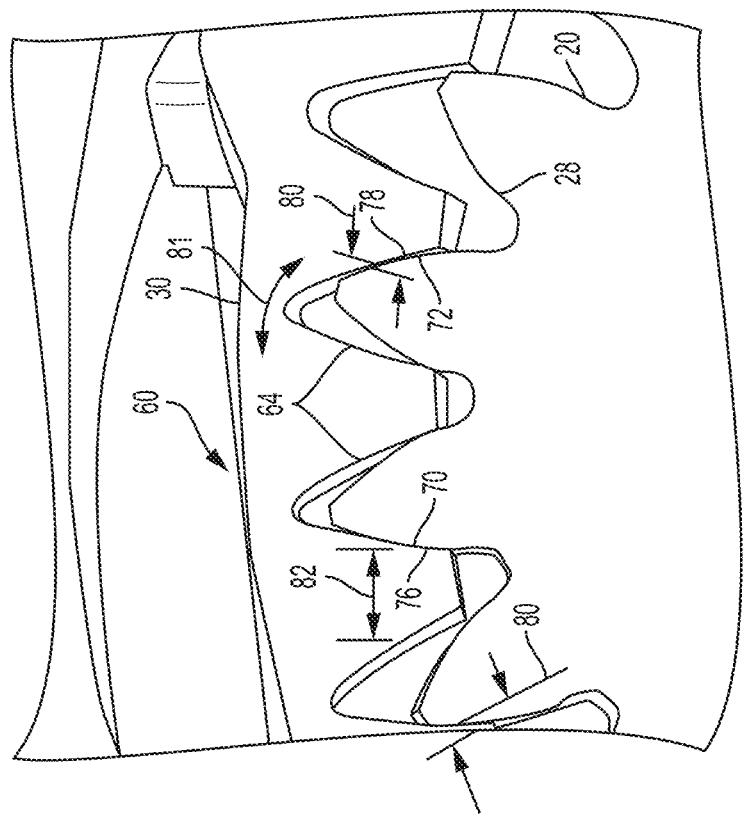
FIG. 6 is a front view of an enlarged portion of FIG. 4.
Figure 5:
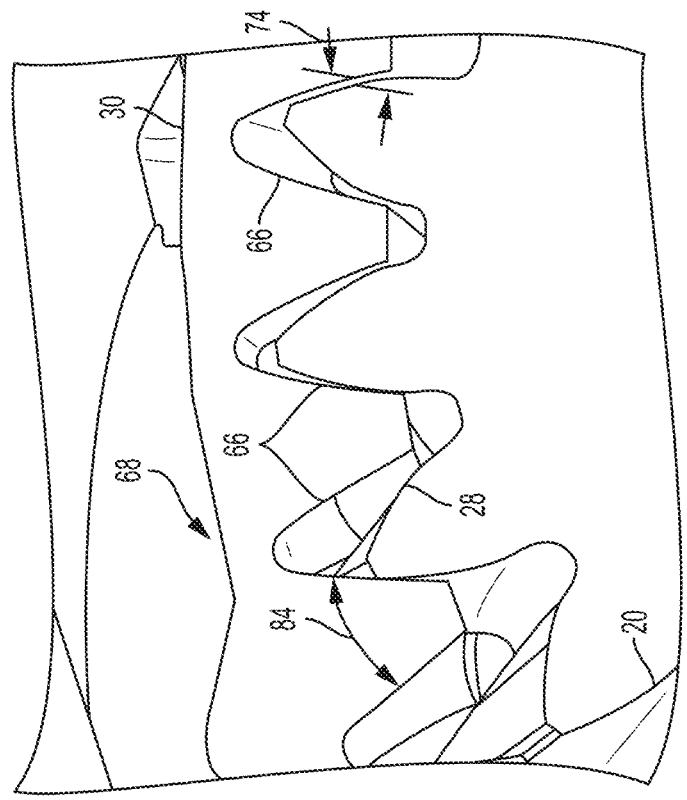
FIG. 5 is a front view of an enlarged portion of FIG. 3.

FIG. 5 is a front view of an enlarged portion of FIG. 3 and FIG. 6 is a front view of an enlarged portion of FIG. 4. As seen in FIG. 5, when teeth 28 of the first gear 20 engage with the second set of gear teeth 66 of the second gear 30, corresponding surfaces 70, 72 of the teeth 28 of the first gear 20 and second set of gear teeth 66 may have a second backlash 74 (as measured by distance therebetween). As seen in FIG. 6, when teeth 28 of the first gear 20 engage with the first set of gear teeth 64 of the second gear 30, corresponding surfaces 76, 78 of the teeth 28 of the first gear 20 and first set of gear teeth 64 may have a first backlash 80 therebetween. The first backlash 80 can be less than the second backlash 74. In some such embodiments, the first backlash 80 can be zero and the second backlash 74 can be non-zero. Accordingly, when the first set of gear teeth 64 engage with the teeth 28 of the first gear 20, a surface 76 of one or more of the first set of gear teeth 64 can rest against a corresponding surface 70 of the teeth 28 of the first gear 20. In further embodiments, the first backlash 80 can be negative. In embodiments whereby the first backlash 80 is less than the second backlash 74, the first set of gear teeth 64 (defined on first peripheral portion 60 and/or second peripheral portion 62) can twist circumferentially (e.g., along direction 81 shown in FIG. 6) so as to generally conform to the contours of the teeth 28 and thereby reduce and/or eliminate or result in a negative value of) backlash therebetween.

As is appreciable from FIGS. 5 and 6, backlash may be reduced (e.g., to zero) at certain portions wherein the torque (and correspondingly, the plunger 40) reverses direction. Referencing FIGS. 1 and 2, the first set of gear teeth 64 extending over the first peripheral portion 60 engages with the teeth 28 of the first gear 20 when the plunger 40 is in the first axial position 44. In certain embodiments, the first set of gear teeth 64 extending over the second peripheral portion 62 engages with the teeth 28 of the first gear 20 when the plunger 40 is in the second axial position 46. Accordingly, the first set of gear teeth 64 extending over the first peripheral portion 60 engages with the teeth 28 of the first gear 20 when the first gear 20 reverses direction from a first rotational direction (e.g., clockwise when viewed along FIG. 1) to a second rotational direction (e.g., counter-clockwise when viewed along FIG. 1), correspondingly resulting in axial movement of the plunger 40 from the first axial position 44 toward the second axial position 46. Similarly, the first set of gear teeth 64 over the second peripheral portion 62 engages with the teeth 28 of the first gear 20 when the first gear 20 reverses direction from the second rotational direction to the first rotational direction, correspondingly resulting in axial movement of the plunger 40 from the second axial position 46 toward the first axial position 44.

According to some non-limiting embodiments, the backlash reduction can correspond to instances where the torque (and/or load on the plunger 40) is reduced to a minimum during operation of the gear drive system 10. In such cases, a first torque is transmitted by the first gear 20 when the first set of gear teeth 64 defined over the first peripheral portion 60 and/or the second peripheral portion 62 engages with the teeth 28 of the first gear 20. In some such embodiments, a second torque is transmitted by the first gear 20 when the second set of gear teeth 66 engages with the teeth 28 of the first gear 20. Appreciably, the first torque is less than the second torque. Thus, when the torque is a minimum (e.g., zero), reduced (or zero) backlash engagement occurs between the first gear 20 and the second gear 30.

Referring again to FIGS. 5 and 6, the first set of gear teeth 64 and the second set of gear teeth 66 can have dimensions so as to permit a reduced (e.g., below an acceptable amount, zero or negative) backlash when the teeth 28 of the first gear 20 engages with the first set of gear teeth 64. In some such embodiments, the first set of gear teeth 64 can have teeth 28 with a first gear tooth spacing 82 between adjacent gear teeth 33. The first gear tooth spacing 82 can be defined on at least one of root circle, base circle, pitch circle, addendum circle and the like on the second gear 30. The second set of gear teeth 66 can have a second gear tooth spacing 84, measured on the same representative circle (root circle, base circle, pitch circle, addendum circle and the like), at which the first gear tooth spacing 82 is measured. In an example, the first gear tooth spacing 82 and the second gear tooth spacing 84 are both measured on the pitch circle of the second gear 30. The first gear tooth spacing 82 can be less than the second gear tooth spacing 84, such that when the teeth 28 of the first gear 20 engage with the first set of gear teeth 64, there is a tighter frictional engagement than when the teeth 28 of the first gear 20 engage with the second set of gear teeth 66. The first set of gear teeth 64 and the second set of gear teeth 66 may thus have generally similar shape and dimensions, with the exception of gear tooth spacing. Advantageously, such embodiments permit retrofitting the second gear 30 into existing gear drive systems to provide noise reduction.

In non-limiting advantageous aspects of the present disclosure, the first peripheral portion 60 and/or second peripheral portion 62 can be more resilient than the third peripheral portion 68. For instance, as described above, the first gear tooth spacing 82 can be less than the second gear tooth spacing 84, thereby resulting in a tighter fit between the first set of gear teeth 64 and the teeth 28 of the first gear 20, than the second set of gear teeth 66 and the teeth 28 of the first gear 20. In some such embodiments, the second gear 30 can have portions that are resilient to absorb any structural stresses associated with the tight frictional fit between the first set of gear teeth 64 and the teeth 28 of the first gear 20. For instance, portions of the second gear 30 may be made deformable.

Figure 7:
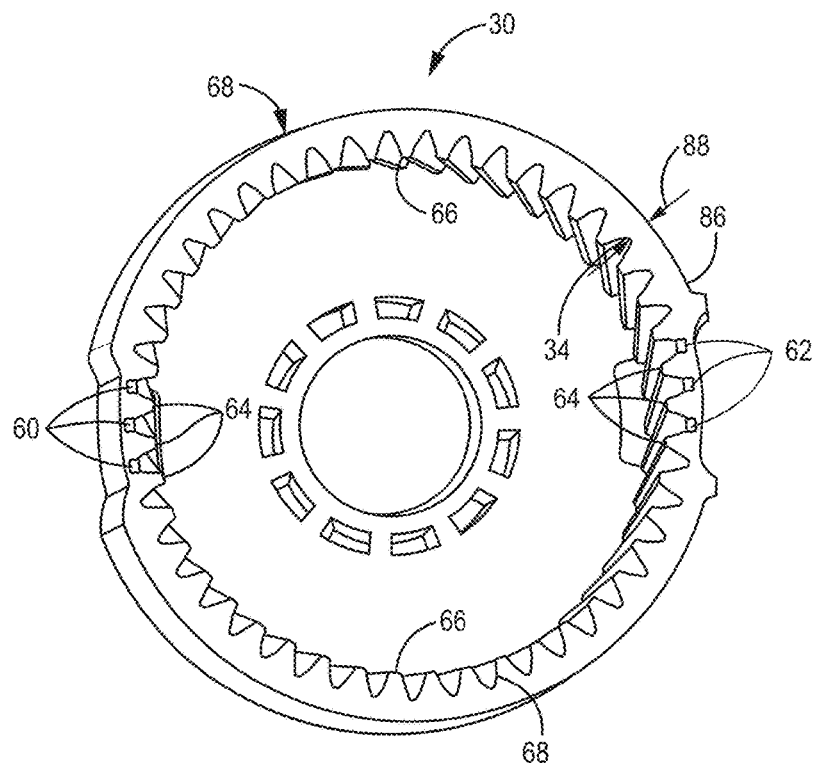
FIG. 7 is a front perspective view of a gear of the gear drive system shown in FIG. 1 according to an embodiment.

FIG. 7 is a front perspective view of a second gear 30 according to a non-limiting embodiment. As seen in FIG. 7, in some non-limiting embodiments, the gear teeth 33 of the second gear 30 can be defined on an interior surface 34. The interior surface 34 can be a non-planar surface if the second gear 30 is a ring gear. Appreciably, in such cases, the first peripheral portion 60, the second peripheral portion 62 and the third peripheral portion 68 can each correspond to a non-planar portion. In some such embodiments, the second gear 30 has an outer surface 86. The outer surface 86 can be an outermost surface according to certain non-limiting exemplary embodiments. The outer surface 86 can be radially spaced apart from the interior surface 34 by a radial thickness 88. The radial thickness 88 can be non-uniform around the periphery of the gear. For instance, as seen in an embodiment illustrated by FIG. 7, the radial thickness 88 in the first peripheral portion 60 can be less than the radial thickness 88 in the third peripheral portion 68. Additionally, the radial thickness 88 in the second peripheral portion 62 can also be less than the radial thickness 88 in the third peripheral portion 68.

As described above, and with continued reference to FIG. 7, the first peripheral portion 60 and the second peripheral portion 62 may correspond to portions with a tight engagement between teeth of the second gear 30 and the teeth 28 of the first gear 20 as a result of reduced (e.g., zero) backlash. In such cases, advantageously, the reduced radial thickness 88 of the first peripheral portion 60 and the second peripheral portion 62 may lead to increased deformability of the first peripheral portion 60 and the second peripheral portion 62, relative to the deformability of the third peripheral portion 68. The increased deformability of the first peripheral portion 60 and the second peripheral portion 62 may absorb any structural loads (e.g., shear or bending stresses) associated with the tighter fit (and reduced backlash) between the first gear 20 and the second gear 30. As a result of deformability of the first peripheral portion 60 and the second peripheral portion 62, in some embodiments, the first backlash 80 can be zero and/or less than zero (e.g., negative backlash). A backlash of less than zero can correspond to a situation when the first gear 28 deforms portions of the second gear 30.

Figure 8:
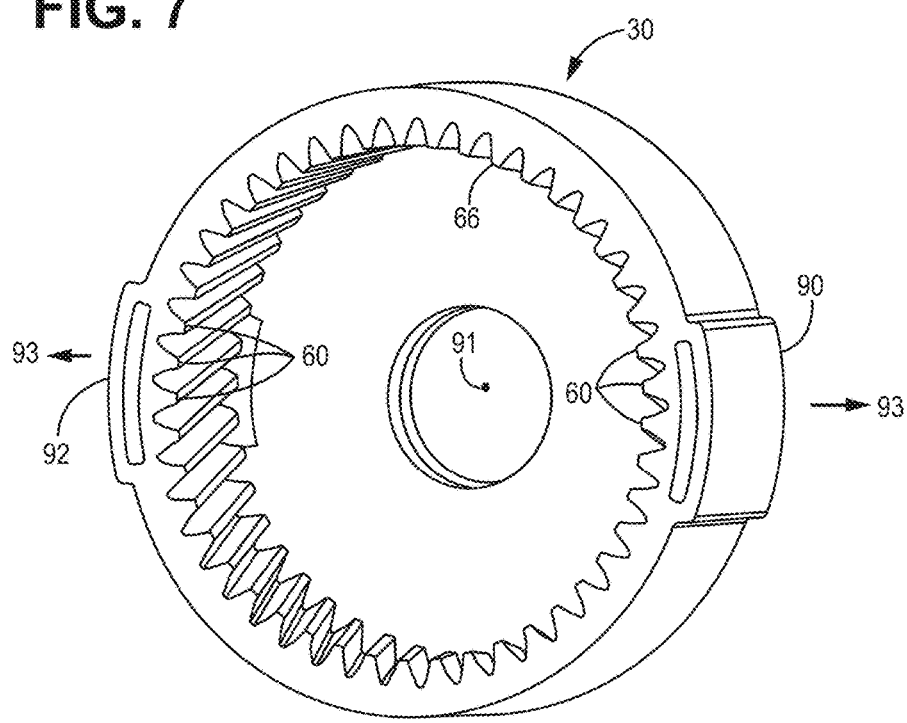
FIG. 8 is a front perspective view of a gear of the gear drive system shown in FIG. 1 according to another embodiment.

FIG. 8 is a front perspective view of a second gear 30 according to another non-limiting embodiment. The embodiment of FIG. 8 can be substantially similar to the embodiment of FIG. 7. In the embodiment of FIG. 8, optionally, a first flange 90 can be formed on the first peripheral portion 60, so as to structurally support the first peripheral portion 60. Additionally, a second flange 92 can be formed on the second peripheral portion 62, so as to structurally support the second peripheral portion 62. The first flange 90 and the second flange 92 can provide additional structural support when the first peripheral portion 60 and the second peripheral portion 62 undergo deformation (e.g., due to tight fitting engagement with the first gear 20, respectively). In some such embodiments, the deformation of the first peripheral portion 60 and/or second peripheral portion 90 can be radially outward relative to the center 91 of the second gear 30. As seen in FIG. 8, the first flange 90 and the second flange 92 can be radially spaced apart from the outer surface 86 so as to permit the first peripheral portion 60 and the second peripheral portion 62 to radially deform (e.g., along arrows 93) while supporting any additional structural loads that may arise during such a radial deformation.

Embodiments according to the present disclosure provide one or more advantages. Some of the disclosed embodiments result in reduced noise during operation of the gear drive, particularly at portions where motor torque and/or plunger direction reverses. In some cases, it becomes possible to retrofit existing gear drives by replacing one of the two gears (e.g., the driven ring gear) to provide a reduced noise gear drive system. Further, as a result of having reduced or zero backlash over certain portions of the gear while having a more typical backlash (e.g., non-zero backlash) over the remainder of the gear, overheating and/or excessive structural loads to the gear can be reduced, thereby protecting the operating life of the gear drive system.

Various examples have been described. These and other examples are within the scope of the following claims.

The invention claimed is:

1. A gear, comprising:
a first peripheral portion;
a second peripheral portion circumferentially offset to the first peripheral portion;
a third peripheral portion extending circumferentially between the first peripheral portion and the second peripheral portion;
a first set of a plurality of gear teeth defined peripherally over the first peripheral portion, the first set of the plurality of gear teeth including at least three gear teeth, each gear tooth of the first set of the plurality of gear teeth having a first gear tooth spacing between adjacent gear teeth of the first set of the plurality of gear teeth; and
a second set of a plurality of gear teeth defined peripherally over the third peripheral portion, the second set of the plurality of gear teeth including at least three gear teeth, each gear tooth of the second set of the plurality of gear teeth having a second gear tooth spacing between adjacent gear teeth of the second set of the plurality of gear teeth, the first gear tooth spacing of the first set of the plurality of gear teeth being less than the second gear tooth spacing of the second set of the plurality of gear teeth,
the first peripheral portion being more resilient than the third peripheral portion, resulting in:
a first backlash between the first set of gear teeth and teeth of an intermeshing gear, and
a second backlash between the second set of gear teeth and the teeth of the intermeshing gear,
the first backlash being less than the second backlash.

2. The gear of claim 1, wherein the gear is substantially ring-shaped and at least a portion of each of the first peripheral portion, the second peripheral portion, and the third peripheral portion include a curved surface.

3. The gear of claim 2, wherein the first set of gear teeth and the second set of gear teeth are each formed on an interior surface of the gear.

4. The gear of claim 3, further comprising an outer surface radially spaced apart from the interior surface by a radial thickness, the radial thickness being non-uniform around the periphery of the gear.

5. The gear of claim 4, wherein the radial thickness of the gear in the first peripheral portion is less than the radial thickness of the gear in the third peripheral portion.

6. The gear of claim 5, further comprising a first flange formed on the first peripheral portion, so as to structurally support the first peripheral portion when engaged with the intermeshing gear, the first flange being radially spaced apart from the outer surface.

7. The gear of claim 6, wherein the radial thickness of the gear in the second peripheral portion is less than the radial thickness of the gear in the third peripheral portion.

8. The gear of claim 7, further comprising a second flange formed on the second peripheral portion, so as to structurally support the second peripheral portion when engaged with the intermeshing gear, the second flange being radially spaced apart from the outer surface.

9. The gear of claim 4, wherein the second peripheral portion includes the first set of gear teeth.

10. The gear of claim 1, wherein, the first set of gear teeth twist circumferentially relative to teeth of the intermeshing gear when the first peripheral portion engages with the intermeshing gear.

11. The gear of claim 10, wherein, the first peripheral portion deforms radially outwardly relative to the center of the intermeshing gear, when the first peripheral portion engages with the intermeshing gear.

12. A gear, comprising:
a first peripheral portion;
a second peripheral portion; and
a first plurality of gear teeth defined peripherally over the first peripheral portion and the second peripheral portion of the gear, the first plurality of gear teeth including at least three gear teeth, each gear tooth of the first plurality of gear teeth, defined peripherally over the first peripheral portion and the second peripheral portion, having a first gear tooth spacing between adjacent gear teeth of the first plurality of gear teeth, the first gear tooth spacing over at least one of the first peripheral portion and the second peripheral portion being less than a second gear tooth spacing between each of a second plurality of gear teeth at portions substantially other than the first peripheral portion and/or the second peripheral portion, the second plurality gear teeth including at least three gear teeth, and the second gear tooth spacing being between adjacent gear teeth of the second plurality of gear teeth,
the first peripheral portion and/or the second peripheral portion being more resilient relative to portions other than the first peripheral portion and/or the second peripheral portion, resulting in a first backlash between the first plurality gear teeth and teeth of another gear being less than a second backlash between the second plurality of gear teeth and the teeth of another gear.

13. The gear of claim 12, wherein the second peripheral portion is peripherally opposite to the first peripheral portion.

14. The gear of claim 13, wherein the first gear tooth spacing of teeth over the second peripheral portion being generally equal to the first gear tooth spacing of teeth at the first peripheral portion.

15. A gear drive system, comprising:
a first gear comprising a plurality of teeth; and
a second gear, comprising:
a first peripheral portion,
a second peripheral portion circumferentially opposite to the first peripheral portion,
a first set of a plurality of gear teeth defined peripherally over the first peripheral portion and/or the second peripheral portion, the first set of the plurality of gear teeth including at least three gear teeth, each gear tooth of the first set of the plurality of gear teeth having a first gear tooth spacing between adjacent gear teeth of the first set of the plurality of gear teeth,
a second set of a plurality of gear teeth defined peripherally at portions other than one or both of the first peripheral portion and the second peripheral portion, the second set of the plurality of gear teeth including at least three gear teeth, each gear tooth of the second set of the plurality of gear teeth having a second gear tooth spacing between adjacent gear teeth of the second set of the plurality of gear teeth, the first gear tooth spacing of the first set of the plurality of gear teeth being less than the second gear tooth spacing of the second set of the plurality of gear teeth, the first peripheral portion and/or the second peripheral portion being more resilient relative to portions other than the first peripheral portion and/or the second peripheral portion, resulting in a first backlash between the first set of gear teeth and the teeth of the first gear, and a second backlash between the second set of gear teeth and the teeth of the first gear, the first backlash being less than the second backlash.

16. The gear drive system of claim 15, wherein the first gear is connectable to a motor shaft and configured to rotate in response to torque transmitted by the motor shaft.

17. The gear drive system of claim 16, wherein the second gear is configured to be driven by the rotation of the first gear, the second gear being connectable to at least one of a camshaft and an eccentric and engageable with a plunger driving a pump, the plunger being movable along its axis between a first axial position and a second axial position in response to the rotation of the second gear.

18. The gear drive system of claim 17, wherein the first set of gear teeth over the first peripheral portion engages with the teeth of the first gear when the plunger is in the first axial position, and the first set of gear teeth over the second peripheral portion engages with the teeth of the first gear when the plunger is in the second axial position.

19. The gear drive system of claim 17, wherein the first set of gear teeth over the first peripheral portion engages with the teeth of the first gear when the torque transmitted by the first gear reverses direction from a first direction to a second direction, correspondingly resulting in axial movement of the plunger from the first axial position toward the second axial position.

20. The gear drive system of claim 19, wherein the first set of gear teeth over the second peripheral portion engages with the teeth of the first gear when the torque transmitted by the first gear reverses direction from the second direction to the first direction, correspondingly resulting in axial movement of the plunger from the second axial position toward the first axial position.

21. The gear drive system of claim 16, wherein,
a first torque is transmitted by the first gear when the first set of gear teeth defined over the first peripheral portion and/or the second peripheral portion engages with the teeth of the first gear;

a second torque is transmitted by the first gear when the second set of gear teeth defined over the portion other than the first peripheral portion and/or the second peripheral portion engages with the teeth of the first gear; and the first torque is less than the second torque.

22. The gear drive system of claim 21, wherein the first torque is zero.

23. The gear drive system of claim 15, wherein the plurality of teeth of the first gear are defined on an exterior surface of the first gear, and the first set of gear teeth and the second set of gear teeth of the second gear are defined on an interior surface of the second gear.

24. The gear drive system of claim 23, wherein the first gear has a first central axis, the first gear being rotatable about the first central axis, and the second gear has a second central axis, the second gear being rotatable about the second central axis, the first central axis being radially offset from the second central axis.

25. The gear drive system of claim 24, wherein the first gear is housed interior to the second gear.

\* \* \* \* \*